(12) United States Patent
Tanaka (10) Patent No.: US 8,515,186 B2
(45) Date of Patent: Aug. 20, 2013

(54) IMAGE PROCESSOR, IMAGE PROCESSING METHOD AND STORAGE MEDIUM

(75) Inventor: Tetsuomi Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1055 days.

(21) Appl. No.: 11/611,722

(22) Filed: Dec. 15, 2006

(65) Prior Publication Data

US 2007/0147689 A1      Jun. 28, 2007

(30) Foreign Application Priority Data

Dec. 26, 2005    (JP) .................................. 2005-372431

(51) Int. Cl.
*G06K 9/36*    (2006.01)
(52) U.S. Cl.
USPC .......................................................... 382/232
(58) Field of Classification Search
USPC ................................................ 382/181–253
See application file for complete search history.

(56) References Cited

U.S. PATENT DOCUMENTS

| 5,907,835 A | 5/1999 | Yokomizo et al. | |
| 2002/0037100 A1* | 3/2002 | Toda et al. | 382/166 |
| 2002/0048413 A1* | 4/2002 | Kusunoki | 382/282 |
| 2002/0057850 A1* | 5/2002 | Sirohey et al. | 382/299 |
| 2003/0086615 A1* | 5/2003 | Dance et al. | 382/200 |
| 2005/0237356 A1* | 10/2005 | Lee | 347/19 |

FOREIGN PATENT DOCUMENTS

| JP | 8-147446 A | 6/1996 |
| JP | 2003-018413 A | 1/2003 |

* cited by examiner

*Primary Examiner* — Alex Liew
(74) *Attorney, Agent, or Firm* — Canon USA Inc. IP Division

(57) ABSTRACT

An image processing apparatus according to the present invention has a determining unit for determining a size of an image, a resolution-setting unit for setting a resolution based on the size of the image, and a recognizing unit for recognizing whether text is included in the image having the determined resolution. Therefore a text portion in the image can be recognized efficiently.

8 Claims, 9 Drawing Sheets

IMAGE PROCESSOR, IMAGE PROCESSING METHOD AND STORAGE MEDIUM

BACKGROUND OF THE INVENTION

1. Field of the Invention

The present invention relates to compression techniques for compressing images including text portions.

2. Description of the Related Art

In recent years, there have been increasing demands for digitalization of documents by scanners which read paper documents and for conversion of formats of electronic documents for information sharing. In general, an image of a page captured by a scanner is constituted by raster data. For a format conversion of an electronic document, a page of the electronic document having a specific format may be converted into raster data. When a paper document is converted into an electronic document, the amount of data becomes large. Therefore, a technique disclosed, for example, in Japanese Patent Laid-Open No. 08-147446 (corresponding to U.S. Pat. No. 5,907,835) is known in which the amount of data is reduced by JPEG compression.

JPEG compression is suitable for compression of multilevel images such as photographs but is not suitable for compression of text portions. Japanese Patent Laid-Open No. 2003-018413 (corresponding to U.S. Patent Application Publication No. 2002/0037100) discloses a method for effectively compressing images including a multilevel image and a text portion.

Partial-page image data, which is part of data constituting one page, can contain various sizes of characters in an image constituted by the partial-page image data. However, techniques for effectively recognizing such characters included in partial-page images have not been established in the related art. Therefore, image compression of data according to recognition results of the technique according to the related art does not work effectively.

SUMMARY OF THE INVENTION

The present invention provides techniques for effective recognition of text portions in images shown as partial-page image data.

The present invention further provides techniques for an effective compression of an image recognized as an image including text.

According to an aspect of the present invention, there is provided an image processing apparatus, including a determining unit configured to determine a size of an image, a resolution-setting unit configured to set a resolution based on the size of the image, and a recognizing unit configured to recognize whether text is included in the image having the determined resolution.

Further features of the present invention will become apparent from the following description of exemplary embodiments with reference to the attached drawings.

BRIEF DESCRIPTION OF THE DRAWINGS

FIGS. 7A to 7D are diagrams of the image processing of the present invention, in which

DESCRIPTION OF THE EMBODIMENTS

Exemplary embodiments of the present invention will be described hereinafter with reference to the accompanying drawings.

First Embodiment

Figure 1:
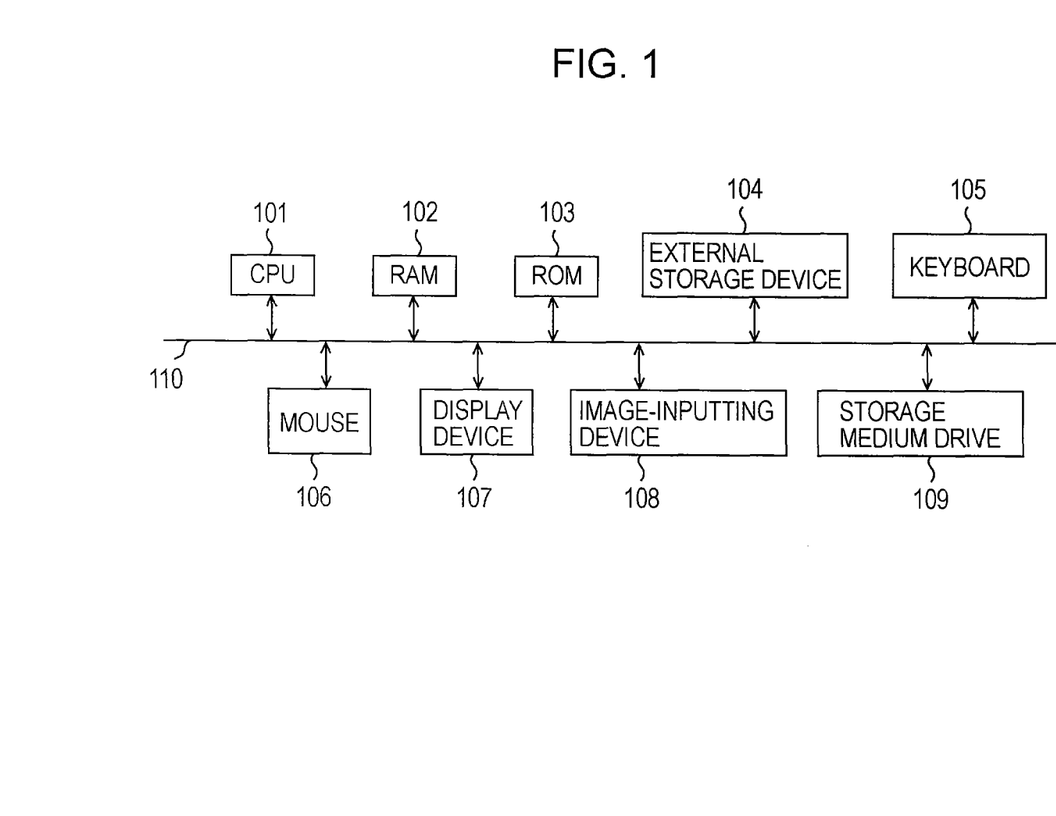
FIG. 1 is a diagram of a hardware configuration of an image processing apparatus according to a first embodiment.

FIG. 1 shows a fundamental configuration of an image compressor according to this embodiment. A central processing unit (CPU) 101 controls the image compressor by using programs and data stored in a random access memory (RAM) 102 or a read-only memory (ROM) 103. The CPU 101 also performs image processing, which will be described later. The RAM 102 serves as a temporary storage area for storing programs and data loaded from an external storage device 104 and a storage medium drive 109 and image data input from an image-inputting device 108. The RAM 102 also serves as a work area used by the CPU 101 executing various processes.

The ROM 103 stores control programs for controlling the image compressor, boot programs and setting data for the image compressor. The external storage device 104, which includes a hard disk, can store programs and data loaded from the storage medium drive 109. If the CPU 101 needs a work area with a size which exceeds the size of the RAM 102, the external storage device 104 can provide a file serving as a work area.

A keyboard 105 and a mouse 106, which functions as pointing devices, can be used to input various commands to the image compressor.

A display device 107, which is configured by a cathode ray tube (CRT) or a liquid crystal display, can display image information and text information. The image-inputting device 108, which is configured by a scanner or a digital camera, can input images as data.

The image-inputting device 108 includes an interface for connection of the image compressor. The storage medium drive 109, which is constituted by, for example, a compact disc read-only memory (CD-ROM) drive, a digital versatile disc read-only memory (DVD-ROM) drive, or a floppy disk (FD) drive, can read programs and data from a storage medium such as a CD-ROM, a DVD-ROM, or an FD. A bus 110 connects the above-described devices to one another.

Figure 2:
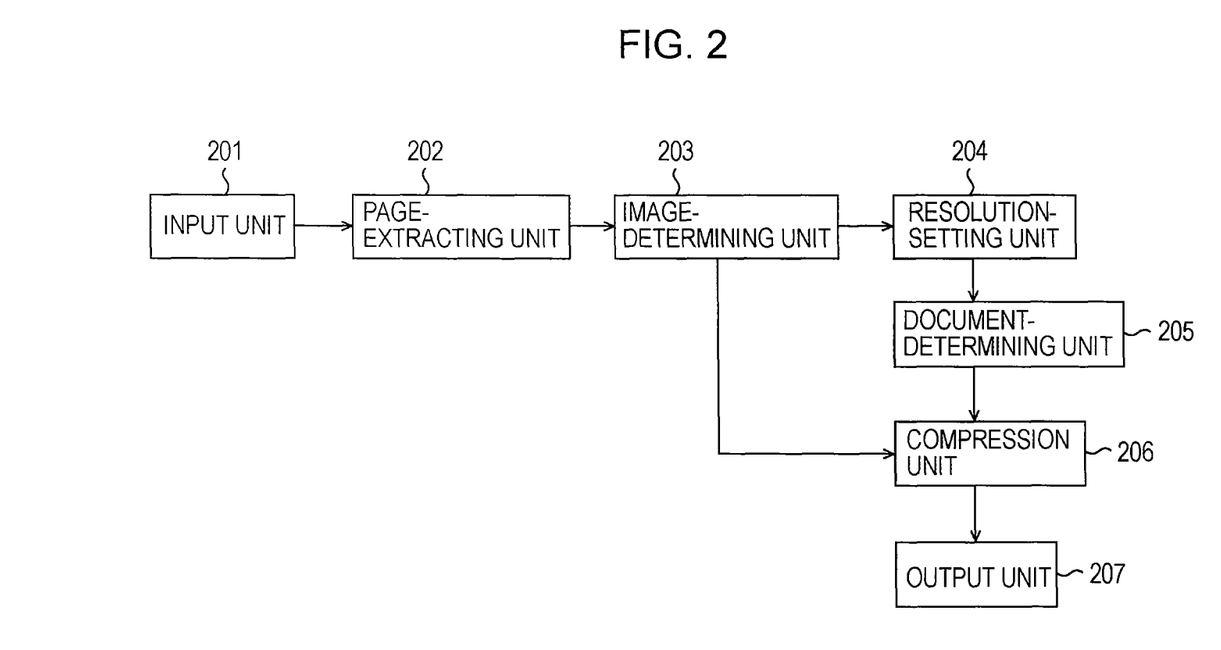
FIG. 2 is a diagram of a functional configuration of the image processing apparatus according to the first embodiment.

FIG. 2 shows a functional configuration of the image processing apparatus according to this embodiment.

An electronic-document-inputting unit 201 is used to input electronic documents (document-image data) having a plurality of pages. A page-extracting unit 202 extracts pages of the electronic documents to be processed input by the electronic-document-inputting unit 201 one by one.

An image-determining unit 203 determines whether a multilevel image, for example, compressed by JPEG compression, exists in the page to be processed which is extracted by the page-extracting unit 202. When a multilevel image is determined to exist in the page to be processed, the image-determining unit 203 determines whether the multilevel image is a single full-page image occupying an entire page or a partial-page image constituting part of a page.

A resolution-setting unit 204 sets an optimum resolution by estimating the resolution on the basis of the amount of data constituting the partial-page image and the size of a display region of the partial-page image in a page. A document-determining unit 205 determines whether the multilevel image to be processed which is compressed by, for example, JPEG compression includes text.

A compression unit 206 analyzes the page to be processed and generates compression data. An output unit 207 outputs the compression data generated in the compression unit 206 after converting the compression data into data of a specific format in accordance with a format of an original electronic document.

A compression method for compressing an electronic document according to this embodiment will be described with reference to a flowchart shown in FIG. 3.

An electronic document is subjected to a series of processes for input and compression as "data" unless otherwise mentioned.

In step S301, an electronic document having a plurality of pages is input through the input unit 201. The electronic document includes data obtained by digitalizing a paper document having a plurality of pages by using a scanner, for example, and data generated by an image editor application, for example. The electronic document has not only pages including text portions but also pages including a mixture of text portions and multilevel images and pages occupied by only a multilevel image.

In step S302, the page-extracting unit 202 extracts a page from the electronic document input through the input unit 201.

In step S303, if it is determined that a page was extracted to be processed in step S302, the process proceeds to step S304. If a page was not extracted to be processed in step S302, the process is terminated. For example, when an electronic document having a plurality of pages is input, the page-extracting unit 202 extracts the first page of the input electronic document. After processing the first page, the page-extracting unit 202 extracts the next page. This process is repeated for all pages.

In step S304, the image-determining unit 203 determines whether the page to be processed includes a multilevel image which is uncompressed or compressed, for example, by JPEG compression. If the page to be processed includes a multilevel image, the process proceeds to step S305. On the other hand, if the page to be processed does not include a multilevel image, the process returns to step S302 to process the next page to be processed.

Here, the multilevel image includes a picture, an illustration, a photograph, a table, and a graph.

In step S305, the image-determining unit 203 determines whether the multilevel image in the page to be processed is a single full-page image. A single full-page image is a single multilevel image that occupies the whole of a page to be processed. When the page to be processed is occupied by a single full-page image, the single full-page image may be generated as follows. For example, such an image is generated by being captured by a scanner and then pasted into the electronic document.

Alternatively, such an image is generated such that when an application for creating, editing, and displaying an electronic document copies content (a multilevel image) from another application, an entire page to be copied is compressed, for example, by JPEG compression and captured as an image covering a single page. Specifically, for example, since the page to be processed includes data which cannot be converted into the format of the electronic document, the entire page to be processed needs to be captured as a single image.

In step S305, if the page to be processed is determined to be occupied by a single full-page image, the full-page image is extracted and the process proceeds to step S306. If the page to be processed is not determined to be occupied by a single full-page image, that is, the page to be processed has a partial-page image, the partial-page image is extracted and the process proceeds to step S308.

In step S306, the compression unit 206 analyzes the extracted full-page image and compresses the full-page image by a method shown in FIG. 4 which will be described later.

The extracted image may include text regardless of whether the extracted image is a full-page image or a partial-page image. The compression method described with reference to FIG. 4 is therefore effective for compression of an image including text. When an image including text is compressed, it is important to determine whether the image includes a text portion and to set an optimum resolution for an image to be processed to extract the text portion accurately.

If an image is extracted by a scanner, for example, resolution information described in the header of the image is used to set a resolution. However, a resolution of an image in a page is not necessarily equal to that used when the image is displayed. Note that when the compression unit 206 compresses a single full-page image, resolution information calculated from the size of the image to be displayed (a paper size of the page) and the number of pixels in a pixel matrix is used.

Figure 4:
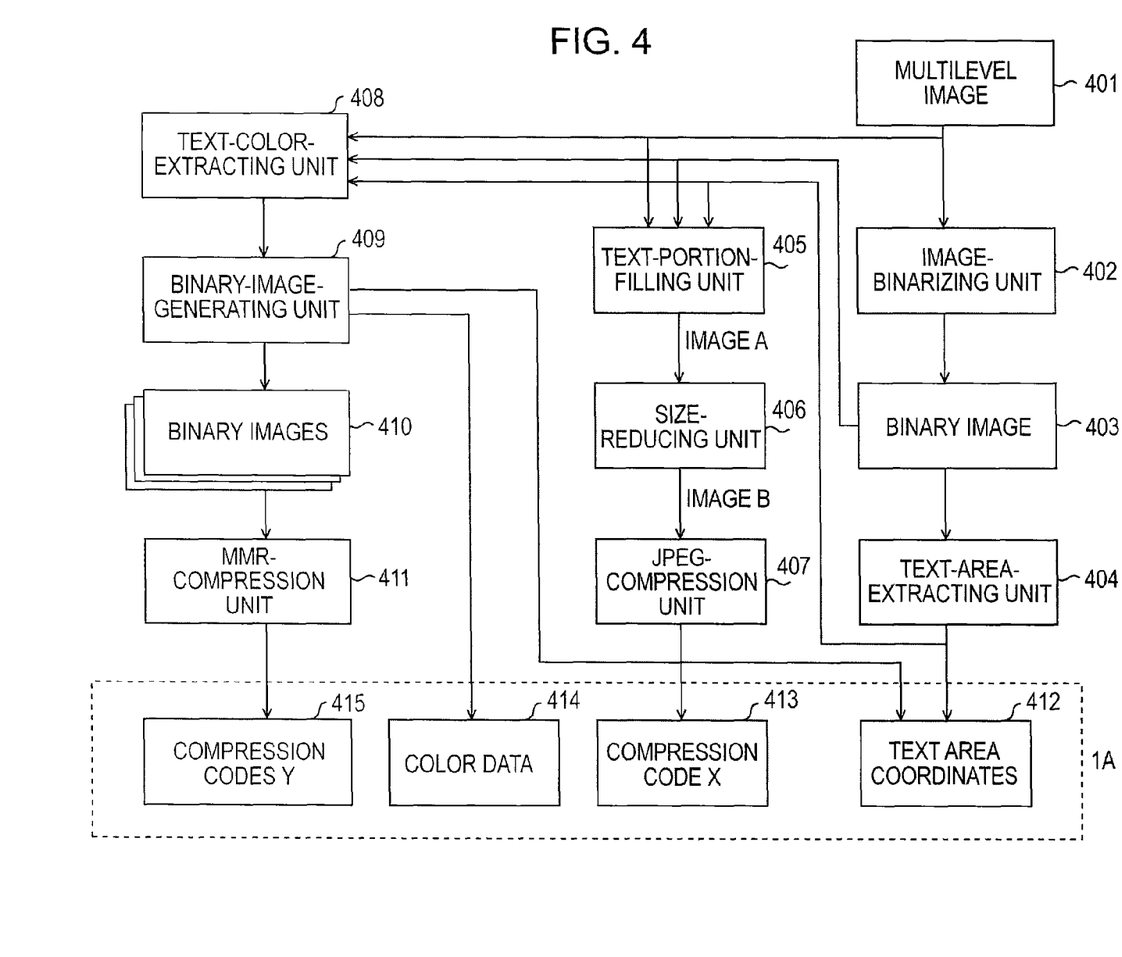
FIG. 4 is a diagram of a functional configuration of a compression process.

When the single full-page image does not include text, the single full-page image is converted into an image having low resolution (a reduced image) by the compression method shown in FIG. 4.

In step S307, the output unit 207 converts the compression data generated in step S306 into data of a specific format compatible with a format of an original electronic document and outputs the converted compression data.

After the process performed in step S307, the process returns to step S302 to process data of the next page.

When the page to be processed has a multilevel image and the multilevel image is a partial-page image, the process from step S308 onward is performed.

A partial-page image in an electronic document can be generated by compressing data generated by an image editor application, for example, by JPEG compression, and capturing the image as an image in a page. Alternatively, the partial-page image can be generated by scanning, for example, a photograph of nature or a paper document and pasting the scanned image into an electronic document. When the partial-page image is pasted into an electronic document, a resolution of the partial-page image may be reduced in accordance with a display area for the partial-page image (an area into which a partial-page image is pasted).

Similarly, the partial-page image may be pasted after increasing an apparent resolution of the partial-page image (i.e., an image of A4-paper size having a resolution of 300 dpi is pasted after the size of the image to be displayed is changed but the amount of data constituting the image is not changed) instead of reducing the resolution of the partial-page image. Furthermore, many other cases can be considered.

In step S308, the resolution-setting unit 204 estimates a resolution from the amount of data constituting the partial-page image and the size of the display area in the page and sets the estimated optimum resolution.

The resolution is set by obtaining a resolution estimated on the basis of an area of the partial-page image to be processed in the page to be processed, that is, by obtaining a resolution A for printing from an actual width of the partial-page image and the number of pixels in a pixel matrix of the image.

Assuming that the partial-page image to be processed is a reduced image of an image having a standard paper size such as an A4-paper size, a resolution B calculated from horizontal and vertical dimensions of the image is obtained. When the resolution B is not lower than a resolution of the image having the standard paper size (for example, 300 dpi for A4-paper size), the resolution B is adopted, and otherwise the resolution A is adopted. The image can have any standard paper size as a reference, but a paper size which is used most often in the area where the language used in the electronic document is used is preferably set.

As a method for selecting the standard paper size, if the partial-page image includes text, a method of obtaining the resolution, by assuming a character size of the text to be a font point size (character size) which is used most often, can be employed. In this method, first, the resolution A is obtained. A text area is extracted from the partial-page image by using a value of the resolution A (by a text-area-extracting unit 404). Then, an average of the number of pixels of the characters along the ordinate axis in the text area is obtained, and the characters are assumed to have a predetermined font point size, and a resolution C can be set.

In step S309, the document-determining unit 205 determines whether the partial-page image to be processed includes text. The compression method shown in FIG. 4 can reduce a resolution of an image not having text, resulting in obtaining of a compression effect. However, since the document-determining unit 205 may erroneously set a resolution which is important for extracting a text portion, the text portion is more likely to be extracted incorrectly. Therefore, image quality may be degraded although an image can be effectively compressed. To address this problem, the document-determining unit 205 determines whether the partial-page image includes a text portion.

As a determination method, the document-determining unit 205 determines whether the image includes text as follows. The text-area-extracting unit 404 shown in FIG. 4 extracts a text area according to the resolution set in step S308. The document-determining unit 205 determines whether the image includes text according to a ratio of the text area in an entire image (an image for one page). The present invention is not limited to this and the determination can be made according to whether document-direction-determining means, which is well known and used in character recognition techniques, can recognize a document text direction (a direction in which the character strings are disposed in a document).

When the document-determining unit 205 determines in step S310 that the partial-page image includes text in the determination method described above, the process proceeds to step S311, and otherwise the process proceeds from step S310 to step S313.

In step S311, the compression unit 206 analyzes the extracted partial-page image and generates compression data. A process performed in step S311 is the same as that performed in step S306.

In step S312, the output unit 207 outputs the compression data generated in step S311 in a format compatible with the original electronic document.

Step S312 and step S307 are different from each other in that the resolution used in step S307 is always the same as a resolution used for display, but a resolution in step S312, which is used for generating the compression data, is not necessarily the same as a resolution used for display. When the resolution used in step S312 does not match that used for display, the resolution used in step S312 is adjusted to match that used for display. Processing then proceeds to step S315.

In step S313, the output unit 207 reduces the size of the image. Since the partial-page image to be processed does not include text, the size of the image is reduced according to a predetermined resolution instead of the resolution used for display. When the predetermined value of the resolution is 100 dpi, the resolution used for display of the image to be processed is compared with the predetermined value. When the resolution used for display of the image to be processed is determined to be larger than 100 dpi, the image is reduced to approximately 100 dpi. When the resolution used for display of the image to be processed is determined to be not more than 100 dpi, the image is output without reduction of the size of the image.

In step S314, the output unit 207 changes a description of the electronic document in accordance with the reduction of the size of the image performed in step S313. Processing then proceeds to step S315.

In step S315, the image-determining unit 203 determines whether there is a remaining partial-page image in the page being processed. When there is a remaining partial-page image, the process proceeds to step S308, and otherwise the process proceeds to step S302.

The process is terminated when the process reaches the final page of the electric document.

The process for generating compression data from a single full-page image or a partial-page image in step S306 and S311 will be described next with reference to FIG. 4.

An image (multilevel image) 401 is extracted in steps S304 and S315 and is subjected to a compression process in step S306 or S311. An image-binarizing unit 402 receives an image and binarizes the image optimally. A binary image 403 is an image obtained after an input image is binarized by the image-binarizing unit 402. When the input image is a binary image, the image-binarizing unit 402 is omitted. The text-area-extracting unit 404 receives the binary image 403, detects a text area, and generates text area coordinates 412.

A text-portion-filling unit 405 receives the text area coordinates 412 and specifies black areas in the binary image 403. In addition, the text-portion-filling unit 405 removes portions of the image data corresponding to the black areas in the binary image 403 and fills the areas corresponding to removed black areas with a color that is the same as the color of the areas surrounding the removed black areas to generate an image A. A size-reducing unit 406 receives the image A and reduces the size of the image A to generate an image B. A JPEG-compression unit 407 receives the image B and subjects the image B to JPEG compression to generate a compression code X 413.

A text-color-extracting unit 408 receives the text area coordinates 412, refers to an original image and the binary image 403 at the coordinates to calculate colors of areas in the original image corresponding to the black areas in the binary image 403, and extracts a plurality of representative colors for text to generate text color data 414.

A binary-image-generating unit 409 refers to the text area coordinates 412, the text color data 414, and the binary image 403 to generate binary images 410 of different colors.

A Modified Modified Read (MMR)—compression unit 411 receives the binary images 410, and subjects the binary images 410 to MMR compression to generate a plurality of compression codes Y 415 each of which corresponds to the color of one of the binary images 410. Any compressing means can be used as long as the compressing means is lossless compressing means, such as Joint Bi-level Image experts Group (JBIG), which attains an excellent compression effect for text images. Suitable means can be employed according to a format of an electronic document to be processed.

The data 412 to 415 generated in each of the units are combined to form compression data 1A. If an image does not include a text area, compression data 1A only includes the compression code X 413 as data.

The operation shown in FIG. 4 will be described with reference to FIGS. 5, 6, and 7A to 7D.

Figure 5:
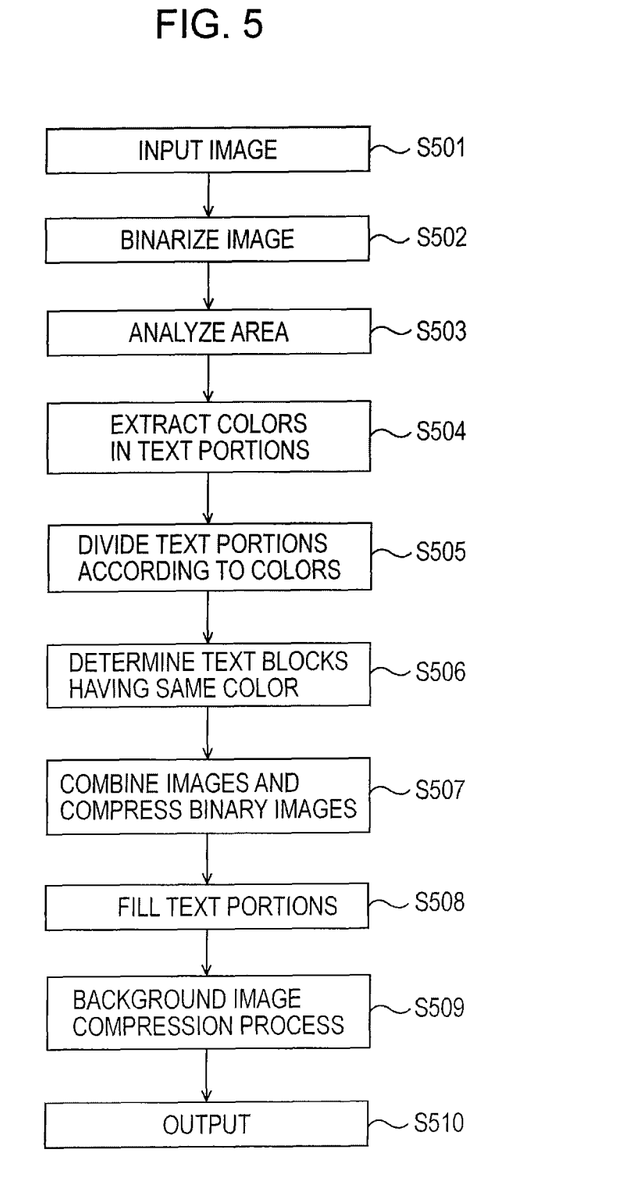
FIG. 5 is a flowchart of the compression process.

An image 401 is read in step S501. In step S502, a binary image is generated by using the image input in step S501. The text-area-extracting unit 404 determines the text areas in the image in step S503 and separates the image into the text areas and non-text areas as shown in FIG. 7B. In step S504, a text color for each of the text areas extracted in step S503 is extracted.

Figure 7A:
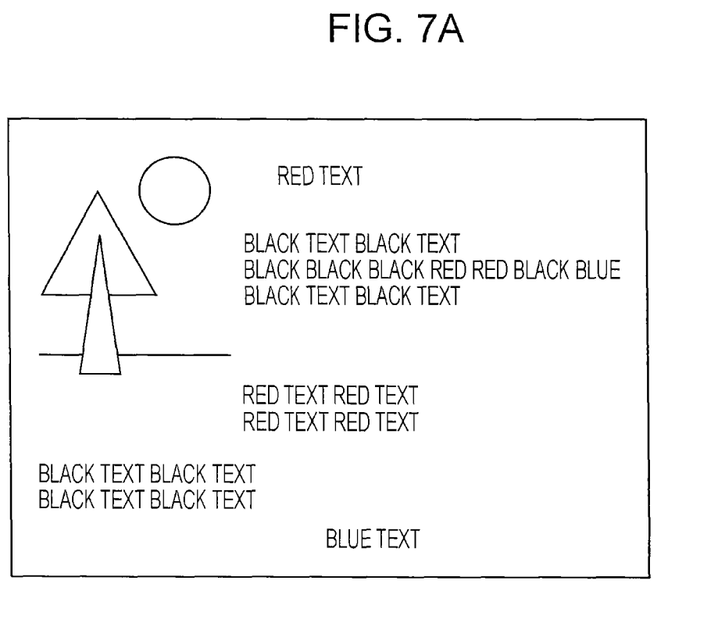
FIG. 7A shows an original image to be subjected to the compression process.
Figure 7B:
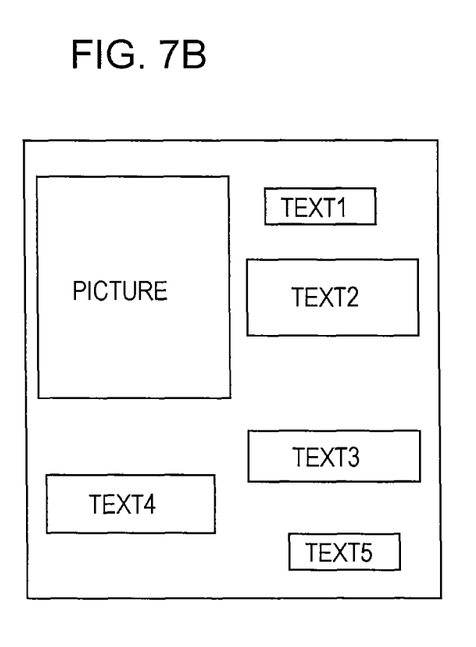
FIG. 7B shows a result of determination of regions.

As shown in FIGS. 7A and 7B, TEXT 1 and TEXT 3 are determined to be areas of red text, TEXT 2 is determined to be an area including black, red, and blue text, TEXT 4 is determined to be an area of black text, and TEXT 5 is determined to be an area of blue text.

Figure 7C:
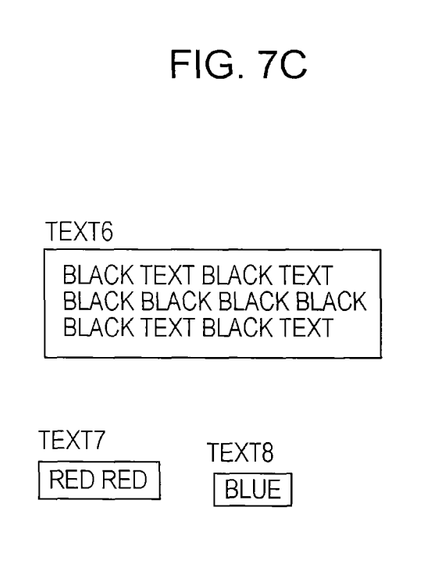
FIG. 7C shows a result of combination of text blocks.

In step S505, TEXT 2, which is determined to include text of a plurality of colors, is divided into binary images, one binary image being created for each of the determined colors, as shown in FIG. 7C. In this example, the area of TEXT 2 is divided into three blocks, i.e., a black block as TEXT 6, a red block as TEXT 7, and a blue block as TEXT 8.

In step S506, the text colors extracted in step S504 are compared with one another. A new color is determined for text blocks determined to have the same color which are to be combined with one another to form an image and the image is stored by binary compression. The combined text blocks are redefined as TEXT 1', TEXT 2', and TEXT 3' as shown in FIG. 7D.

The text blocks are grouped such that RGB color components each having eight bits in the text blocks are reduced to a predetermined range of colors, such as RGB color components each having two bits or three bits, and the text blocks having the reduced RGB color components are compared with one another so as to determine the text blocks having the same color. The predetermined range of colors is determined according to a tone characteristic of the compressed image. For example, in view of the low sensitivity of human eyes to blue, RGB color components in the text blocks may be reduced to 2-2-1 RGB color components or 3-3-2 RGB color components.

To determine the text blocks having text of the same color more precisely, the text blocks may be grouped such that, instead of using RGB model, the color components are converted into color components of the YUV model or LAB model and each of the components of the models is reduced to two or three bits to allow the color difference of text blocks to be distinguished more easily.

Figure 7D:
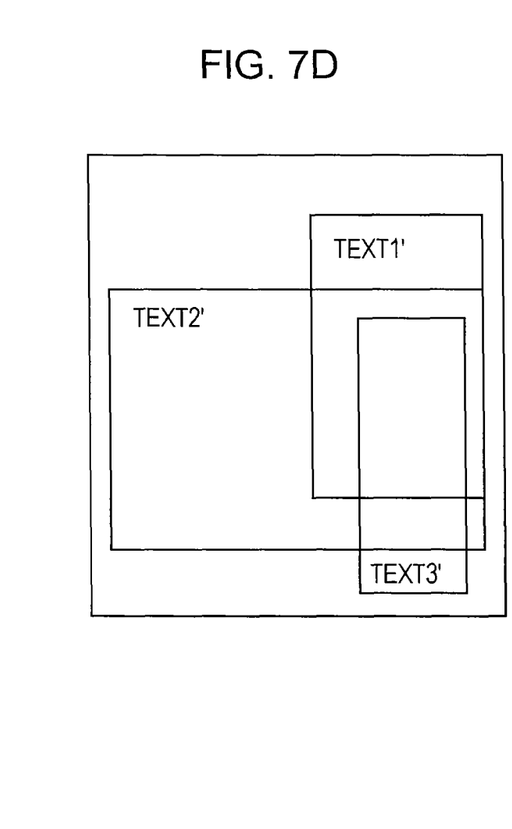
FIG. 7D shows a image of combined text blocks.

In step S507, images of the text blocks determined in step S506 to have text of the same color are combined and a new binary image is generated as shown in FIG. 7D. In step S508, text portions as binary images are removed from a color image. In step S509, the color image after the removal of the text portions is subjected to a multilevel compression. Here, the size of a background image can be reduced to be compressed.

The compression data 1A referred to in FIG. 4 is output as a result of the compression process in step S510.

Figure 6:
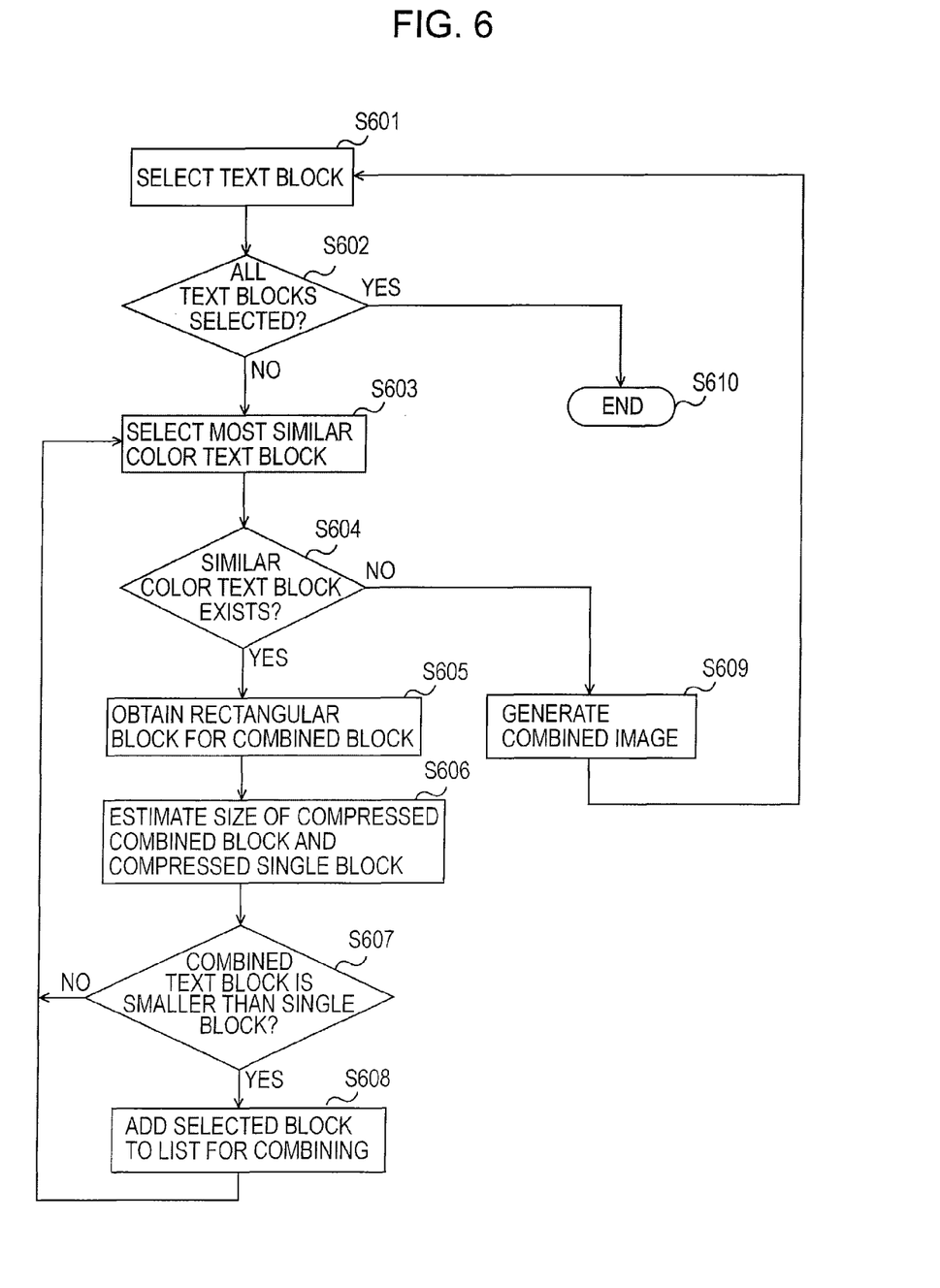
FIG. 6 is a flowchart specifically illustrating steps S506 and S507.

FIG. 6 is a flowchart specifically illustrating steps S506 and S507.

In step S601, a text block in a group of text blocks which are determined to have text of the same color is selected as a reference text block. If a text block to be selected does not exist (S602), the process proceeds to step S610 and is terminated. If a text block to be selected exists, a text block having text of the most-similar color to that of the reference text block is searched for and selected from the group of text blocks which are determined to have text of the same color (step S603).

In step S604, if a text block having text of a similar color is determined to exist, the process proceeds to step S605. If a text block having text of a similar color does not exist, the process proceeds to step S609.

In step S605, a rectangular block constituted by two text blocks combined is obtained.

In step S606, the size of a combined block after compression and the size of a single block after compression which is not combined with another block are calculated. The blocks can be compressed in effect for precise calculation of the size. Alternatively, the size of the combined block after compression and the size of the single block after compression can be obtained with ease by using the equations (1) and (2) below, and processing time is also reduced. The size of a text block that has been divided and compressed is calculated by using the compression ratio A for the text portion obtained in advance.

$$\text{Size of Divided and Compressed Text Block} = (\text{Text 1 Area} + \text{Text 2 Area}) \times A + 2 \times \text{Header Size} \quad (1)$$

Every time the text blocks are combined and compressed, a gap is generated. Since there is no data corresponding to the gap, the gap can be compressed with a much higher compression ratio when compared with the normal compression of the text portion. Assuming that this compression ratio for the gap is a compression ratio B, the equation below is obtained.

$$\text{Size of Combined and Compressed Text Blocks} = (\text{Text Portion Area}) \times A + (\text{Gap Area}) \times B + \text{Header Size} \quad (2)$$

In step S607, the size of a compressed image having the combined text blocks and the size of a compressed image having the text block which is not combined with another text block are compared with each other. If the size of the compressed image having the combined text blocks is smaller than that of the compressed image having the text block which in not combined with another text block, the process proceeds to step S608, and otherwise the process returns to step S603 to obtain the next text block.

In step S608, the selected block is added to a list for an image combining process to be performed later. The process from steps S603 to S608 is repeated until all text blocks having text portions of the same color have been processed, and then the process proceeds to step S609.

In step S609, an image constituted by the combined text blocks is generated and compressed. If it is determined in the process from step S603 to step S608 that no text blocks are to be combined, an image constituted by a single block is compressed.

Then, the process returns to step S601 and steps S601 to S609 are repeated until all text blocks have been compressed and the process proceeds to step S610 to be terminated.

According to the embodiment described above, the text portions in the partial-page image represented by partial-page image data can be recognized efficiently. Furthermore, an image recognized as an image including a text portion can be compressed efficiently.

Second Embodiment

Figure 3:
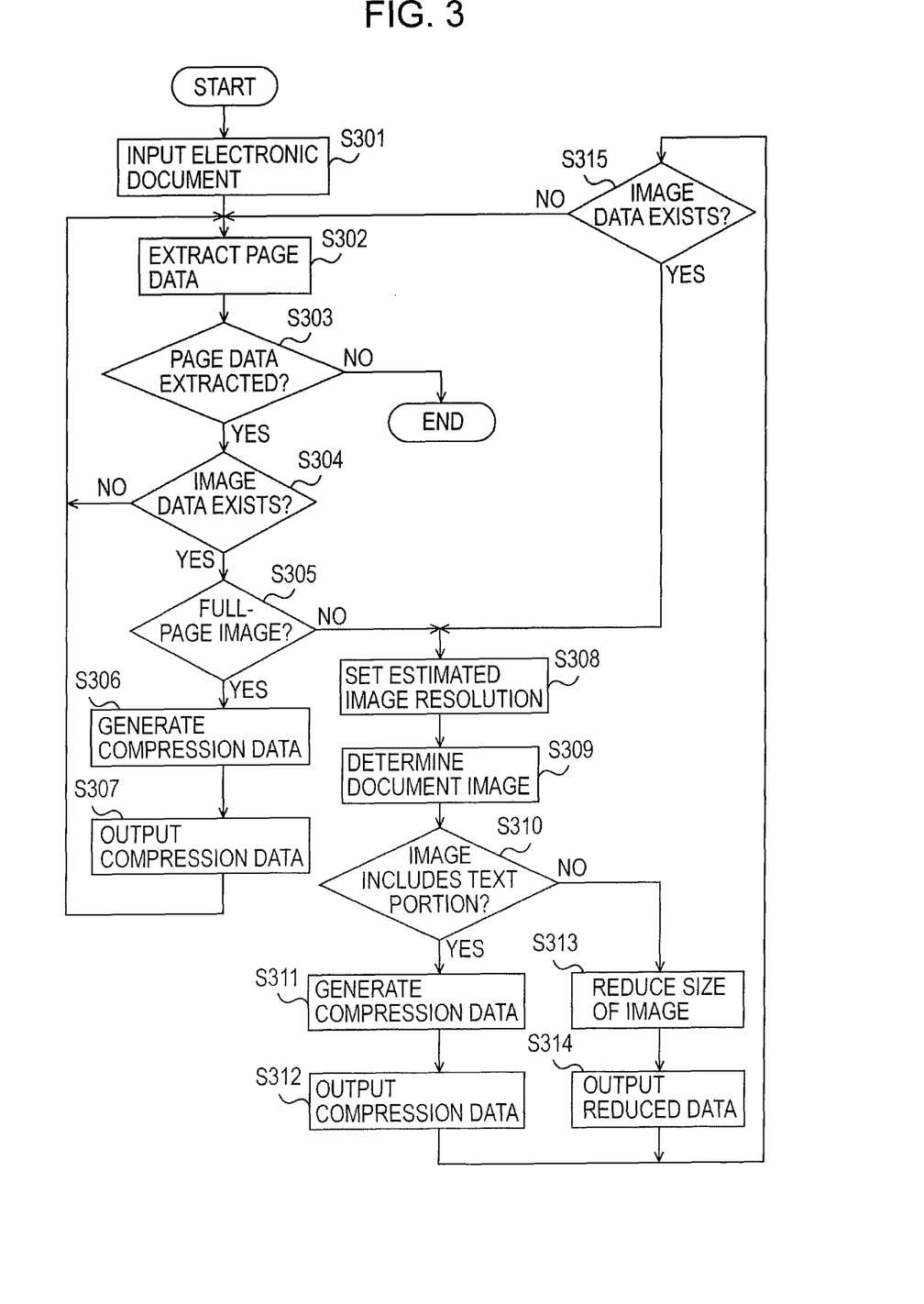
FIG. 3 is a flowchart of image processing according to the first embodiment.

In step S308 of the compression method according to the first embodiment shown in FIG. 3, the estimated resolution is set by selecting one of the possible resolutions. This is a processing efficiency oriented method. Alternatively, in a second embodiment, a probability of selection of a more optimum resolution is enhanced.

Figure 8:
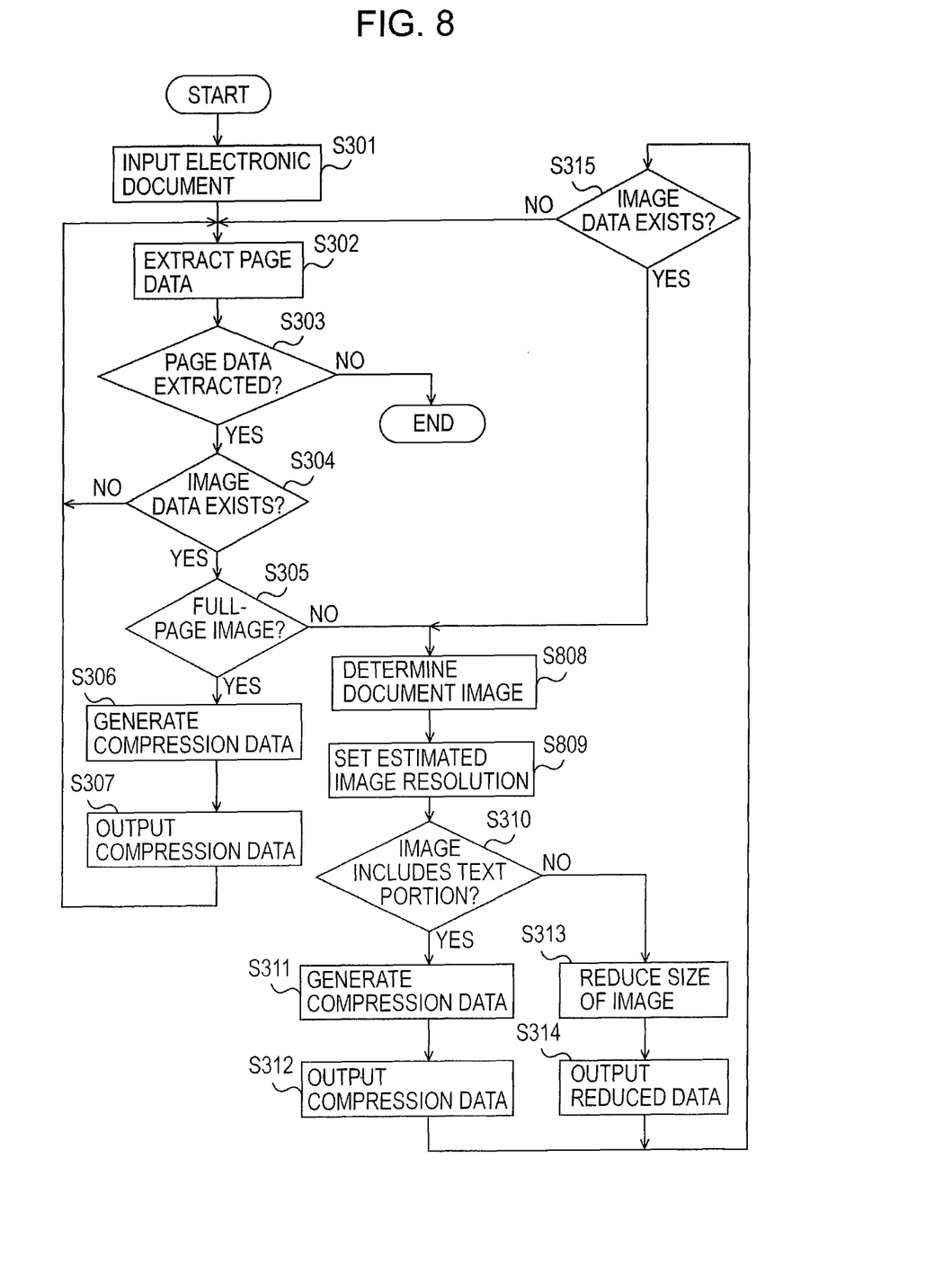
FIG. 8 is a flowchart of a process according to a second embodiment.

A compression method for compressing an electronic document according to the second embodiment will be described with reference to a flowchart shown in FIG. 8.

In the second embodiment, if more than a sufficient amount of time can be allocated for the processing, or if a resolution should be specified accurately, a determination is made as to whether the partial-page image includes a text portion for a plurality of resolutions (in step S808) and a resolution is selected in accordance with a determination result (in step S809).

The second embodiment is the same as the first embodiment except for a process which will be described below.

If direction-determining means is used for determining whether a partial-page image includes a text portion when a resolution is selected in step S809, the certainty of the determination result is used as a selection criterion. If a text-area-extracting method is used for determining whether a partial-page image includes a text portion, a ratio of an extracted text area for each resolution is used as a selection criterion. Then, the resolution having the highest ratio of the text area is selected. Therefore, the text portion in the partial-page image represented by partial-page image data can be recognized efficiently and precisely and the image recognized as an image including a text portion can be compressed effectively.

Other Embodiments

The present invention is not limited to a device and a method for implementing the embodiments described above. Program code (software) for implementing the embodiments described above are supplied to the above-described system or a computer (CPU or Micro Processing Unit (MPU)) in the apparatus, and the system or the computer in the apparatus operates the above-described devices in accordance with the program code. The present invention includes a case where the above-described embodiments are implemented by using this method.

In this case, the program code in the form of software implements the functions of the embodiments described above. Accordingly, the present invention includes the program code and means for supplying the program code to the computer, that is, a recording medium for storing the program code.

Examples of the recording medium for storing such program codes include a floppy disc, a hard disk, an optical disc, a magneto-optical disc, a CD-ROM, a magnetic tape, a non-volatile memory card, and a ROM.

The computer controls each of the devices in accordance with the program code supplied to implement the functions of the embodiments described above. The present invention is not limited to this case and includes program code which operates in cooperation with an operating system (OS) and other application software operating on the computer to implement the embodiments described above.

In addition, the present invention includes the case where a CPU incorporated in a function expansion board of the computer or in a function storage unit connected to the computer operates part of or the entire process in accordance with commands of the supplied program code to implement the embodiments described above.

The embodiments of the present invention are described hereinabove in detail with reference to the accompanying drawings. The specific configurations are not limited to these embodiments and the present invention includes various modifications without departing from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-372431 filed on Dec. 26, 2005, which is hereby incorporated by reference herein in its entirety.

What is claimed is:

1. An image processing apparatus comprising:
   determining means for determining a size of a partial-page image, from a page to be processed which comprises the partial-page image and text;
   resolution-estimating means for, if a first resolution, which is estimated from a length and width of an image obtained when the partial-page image is expanded so as to be a standard paper size, is larger than or equal to a predetermined resolution, setting the first resolution as a resolution of the partial-page image, and if the first resolution is smaller than the predetermined resolution, setting a second resolution, which is estimated from an actual width of the partial-page image for printing and a number of pixels in a pixel matrix of the image; and
   recognizing means for recognizing whether text is included in the image having the estimated resolution.

2. The image processing apparatus according to claim 1, further comprising first compressing means for compressing the image in accordance with a recognition result of the recognizing means.

3. The image processing apparatus according to claim 2, further comprising second compressing means for compressing the image in accordance with an algorithm different from that of the first compressing means when the recognizing means recognizes that the image does not include text.

4. An image processing method for an apparatus including a processor, the method comprising:
   determining, using the processor, a size of a partial-page image, from a page to be processed which comprises the partial-page image and text;
   setting a first resolution, which is estimated from a length and width of an image obtained when the partial-page image is expanded so as to be a standard paper size, as a resolution of the partial-page image, if the first resolution is larger than or equal to a predetermined resolution;
   setting a second resolution, which is estimated from an actual width of the partial-page image for printing and a number of pixels in a pixel matrix of the image, if the first resolution is smaller than the predetermined resolution; and
   recognizing whether text is included in the image having the estimated resolution.

5. A recording medium storing a program for allowing a computer to perform the image processing method of claim 4.

6. An image processing apparatus comprising:
- a determining unit configured to determine a size of a partial-page image, from a page to be processed which comprises the partial-page image and text;
- a resolution-estimating unit configured to, if a first resolution, which is estimated from a length and width of an image obtained when the partial-page image is expanded so as to be a standard paper size, is larger than or equal to a predetermined resolution, set the first resolution as a resolution of the partial-page image, and if the first resolution is smaller than the predetermined resolution, set a second resolution, which is estimated from an actual width of the partial-page image for printing and a number of pixels in a pixel matrix of the image; and
- a recognizing unit configured to recognize whether text is included in the image having the estimated resolution.

7. The image processing apparatus according to claim 6, further comprising a first compressing unit configured to compress the image in accordance with a recognition result of the recognizing unit.

8. The image processing apparatus according to claim 7, further comprising a second compressing unit configured to compress the image in accordance with an algorithm different from that of the first compressing unit when the recognizing unit recognizes that the image does not include text.

* * * * *